United States Patent [19]

Reuter

[11] Patent Number: 4,974,679

[45] Date of Patent: Dec. 4, 1990

[54] LOAD CELL

[76] Inventor: Peter A. Reuter, 168 Payneham Road, Evandale, South Australia, Australia

[21] Appl. No.: 376,298

[22] Filed: Jul. 5, 1989

[30] Foreign Application Priority Data

Jul. 5, 1988 [AU] Australia .................................. PI9159

[51] Int. Cl.⁵ ...................... G01G 3/14; G01G 23/10; G01G 19/413
[52] U.S. Cl. ................................ 177/210 R; 177/185; 177/25.14
[58] Field of Search ................. 177/25.14, 50, 210 FP, 177/185, 210 R

[56] References Cited

U.S. PATENT DOCUMENTS 4,836,308  6/1989  Davis et al. ........................ 177/25.14

Primary Examiner—George H. Miller, Jr.
Attorney, Agent, or Firm—Brown, Martin, Haller & McClain

[57] ABSTRACT

This invention relates to load cells having integral load measurement and measurement data output means. Load cells have previously comprised a load support member and a force detection element and all detection and measurement of the electrical characteristic of the force detection element have take place external to the load cell device. This invention provides a force detection element, at least one pair of voltage reference signal output means, switch means to direct pairs of voltage signals to an amplification means, a temperature sensor means with voltage output, a low pass filter means and analogue to digital conversion means operating on the above filtered and un-filtered outputs of the amplifier signals, a memory circuit which holds a plurality of digital values representative of various applied forces at various ambient temperatures of the load cell and reference voltage signals, a control and processing circuit which controls the pairs of signals switched to the amplification means and the filter means and thereby received by the processing circuit means and which uses the contents of the memory circuit means to calculate values representative of the force applied and produce signals representative of the force applied to the load cell in analogue and digital bit stream format.

8 Claims, 6 Drawing Sheets

LOAD CELL

This invention relates to load cells having integral load measurement and measurement data output means.

In order to measure force it is common to use force measurement elements such as resistance strain gauges and Piezoelectric devices although there are in the art a number of semi-conductor and like devices which can within limitations directly provide a signal which varies in proportion the applied force. However the most commonly used force detection elements at this time are strain gauges which comprise conducting elements that are adhered to a load support member, and upon a force being applied to that member, the resulting deformation of the member also deforms the strain gauge and thereby affects the electrical resistance of the gauge. A functional relationship exists between the force applied and the change in consequent electrical resistance Other gauges are available which provide different electrical output characteristics. In order to obtain accurate results from such strain gauges, it is important that a number of factors be carefully controlled. Very importantly the load support member must be of a suitably stiff material with well known elastic characteristics, often requiring a material which is found not to be suitable for machining a required flat surfaces further suitable for the placement of a strain gauge or gauges upon those surfaces.

Considering that a large variety of load member shapes is required the difficulty of machining and consequently the cost of load cell production is great. Great skill is required for adhering the strain gauge to the surface and these techniques are well documented. It is then necessary to calibrate the load cell, now comprising a load support member to which has been adhered a strain gauge This process of calibration is achieved by applying a known force to the cell at predetermined temperatures such that a relationship between the change of resistance and force can be established The cell is then complete for use and usually supplied with a graphical representation of its characteristics as at the time of the test and which is only valid assuming the load cell is always used within its tolerances.

Load cells have different shapes for different applications and load requirements to ensure that the desired component of force is measured, thus strain gauges having different shapes are positioned in various orientations upon the load cell body.

The accurate measurement of load cell output and the repeatability of that output has been achieved by manufacturing load cells from selected metals and the use of precision milling techniques which is then combined with the precision application of accurately formed strain gauges. Thus characteristics such as gauge factor and cross-sensitivity are controlled to a degree and their effects minimized by attempting to achieve repeatable constructional factors and the use of correction charts for temperature and load conditions.

However, such production and design techniques are very expensive and the reliance on operators to apply correction factors applicable to the particular circumstances is by no means a satisfactory method of use.

These load cells are commonly used in industry and in the final analysis require expert handling and set up to achieve maximum usefulness and accuracy. Techniques of calibration and load cell use and the interpretation of their output signals requires expert attention and skill. More often than not, inaccuracies of measurement result from poor technique of use and unskilled interpretation.

Additionally, load cell characteristics are subject to change and include different outputs for the same applied force These particular effects can be due to environmental variables which include temperature, load cell non-linearity, humidity and electromagnetic conditions which can in some instances be corrected by re-calibration and in practice the skilled load cell user can compensate and minimise these effects.

The effects of temperature can be compensated by the use of a "dummy" load cell in series with an unstressed portion of the specimen or structural member subject to the same temperature conditions, however, the increased cost of an additional cell and the increased operating skill applied is not always an adequate compensation technique and values may be inaccurate or impossible to obtain.

Load cell non-linearity will occur as a result of abuse of the load cell as in the circumstance of loads being applied to the cell which are over their maximum rating. Additionally non-linearity will be inherent in the load cell as a consequence of the construction of the cell and its continued use in certain conditions. In these circumstances the load cell is abandoned or if recoverable calibrated again.

In some circumstances the effects of electromagnetic conditions distort and overwhelm the relatively small voltage and current outputs being carried from the load cell to monitoring equipment and minimisation and compensation techniques cannot be adequately applied which has the effect of creating inaccuracies or making reliable results impossible to obtain.

A further deficiency of current load cells is that only unmodulated analog outputs are provided from the actual load cell. This form of output is more susceptible to electromagnetic interference than other forms and certainly not suitable for direct display, direct computer recording and analysis without further external processing by which time the basic data may have been corrupted or distorted.

Therefore, it is an object of this invention to provide an accurate load cell that has low manufacturing costs, and that overcomes the abovementioned problems of repeated calibration, processing, measurement and display of load cell measurements.

Preferably this invention provides a load cell having integral electronic circuitry to provide automatic adjustment and compensation where necessary for temperature, non-linearity and electromagnetic environmental conditions, and produce an output which is acceptable to a computing device or low cost analog or digital display device. It is a further object of the invention to provide a voltage reference circuit configured and located in the load cell such that accurate and repeatable voltage offset determinations can be made which are appropriate for the level of signal generated by the force measurement element at the time of the actual measurement and experiencing its current environment.

It is a still further preference for this invention to provide a platform of electronic design that allows for the further integration of computer related functions to the body of the load cell.

It is also an preference of this invention to provide a load cell that can be used by persons less skilled than heretofore required.

BRIEF SUMMARY OF THE INVENTION

This invention relates to load cells having integral load measurement and measurement data output means. Load cells have previously comprised a load support member and a force detection element and all detection and measurement of the electrical characteristic of the force detection element has taken place external to the load cell device.

This invention provides a force detection element, at least one pair of voltage reference signal output means, switch means to direct pairs of voltage signals to an amplification means, a temperature sensor means with voltage output, a low pass filter means and analog to digital conversion means operating on the above filtered and unfiltered outputs of the amplifier signals, a memory circuit which holds a plurality of digital values representative of various applied forces at various ambient temperatures of the load cell and reference voltage signals, a control and processing circuit which controls the pairs of signals switched to the amplification means and the filter means and thereby received by the processing circuit means and which uses the contents of the memory circuit means to calculate values representative of the force applied and produce signals representative of the force applied to the load cell in analog and digital bit stream format.

More specifically, the invention comprises a load cell, comprising a load support member, a force detection element cooperating with the load support member such that force applied to the load support member causes changes to electrical characteristics of the force detection element, means providing a force detection element output dependent upon force applied, at least one reference electrical signal output means, amplification means for the said force detection and electrical signal outputs, means providing analog to digital conversion of the said force detection and electrical signal outputs, a memory oirouit which holds a plurality of digital values representative of applied forces and reference signals, a control and processing circuit means which controls the said force detection and electrical signal output signals to the processing circuit means and which uses the contents of the memory circuit means to calculate values representative of the force applied and produce signals representative of the force being applied to the load cell.

Preferably, the invention may further comprise a temperature sensor within said load cell, which provides an electrical output representative of the ambient temperature of the load cell, said electrical output signal is received by the processing circuit to calculate and produce a signal representative of the force applied to the load cell recognizing of course that this does not obviate the use of the device in a constant temperature environment which would not then require a temperature sensor for is it correct operation.

All the measurement and memory circuits are preferably mounted within the load cell housing, and as a result the calibration of the load cell takes into account any variation in the operating characteristics of the various electronic components and any non-linearity of the beam mechanical configuration and further provides data representative of the near absolute force being applied to the load cell. Consequently there are no output leads carrying small analog voltage signals that would easily be affected by electric or magnetic fields in the vicinity of the load cell working area.

In a further aspect of the invention, a method of calibrating the abovementioned load cell comprises, at a known temperature, applying a variety of known forces to the load cell, and recording the known force with the output from the force element and the temperature sensor and performing an algorithm to allow a series of data values representing the characteristics of the load cell under test and then communicating them into the memory circuit within the load cell and repeating the above load application process at a variety of known other temperatures.

The above method is preferably performed with an external central processing unit (however it could also be performed on board with the requisite central processing unit, program and memory requirements) which controls both the change of temperature and force The central processing unit also monitors the output from the load cell and accurate temperature and force application devices.

A load cell in accordance with this invention would therefore not require as precise machining of the load member since the measurement and memory circuit provide for repeatable and accurate output. The device would allow for the varying characteristics of each individual load member to which the device and method are applied and ensures those characteristics are accounted for in the measurement-process and reflected in the force information output. Additionally, the location of all electronic processing and measurement circuitry within the load cell ensures they are all subject to the same electromagnetic and thermal environment, thereby achieving the desirable objective of minimization and or eliminating the use of correction factors which thus increases the repeatability and accuracy of the output of the total device.

BRIEF SUMMARY OF THE DRAWINGS

A preferred embodiment of the invention will now be described, but the invention need not be confined or restricted to the details of this description.

FIG. 1A shows a columnar load support member, FIG. 1B shows a bending beam load support member, FIG. 1C shows a shear element load support member, FIG. 1D shows a diagonally loaded support member, FIG. 1E shows a diaphragm loaded support member.

DETAILED DESCRIPTION OF THE PREFERRED EMBODIMENT

Figure 1:
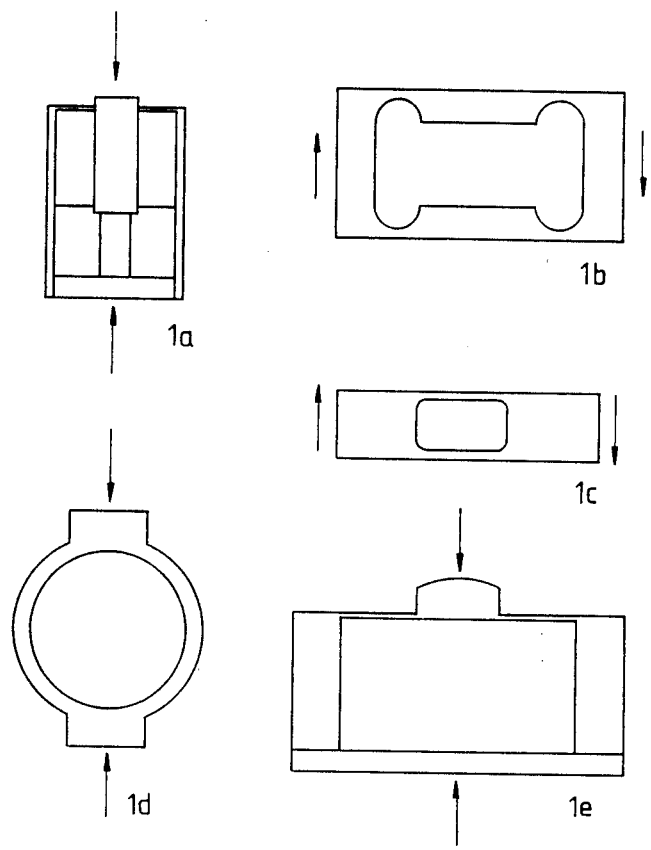
FIG. 1 shows a variety of load cell types.

The embodiment of this invention is but one example of the diverse types of load cells into which the invention may be incorporated. FIG. 1 shows several basic types of force measuring load cells.

FIG. 1A is a columnar load support member which provides a means for gauging longitudinal and transverse strain in a 4 column. The column is supported laterally by diaphragms, which also can be made watertight. This design is commonly used for loads above 2000 kg, since the column becomes too small for lighter loads.

FIG. 1B is a bending beam load support member having dual guided cantilever cells. These are widely used for loads up to 200 kg, and can be designed for very small load ratings (100 gms). The concept leads to low contamination of the wanted signal due to forces in other directions.

FIG. 1C is a shear element load support member which is an extension of the dual guided cantilever design, in which the shear strain in the web is measured It also strongly discriminates against unwanted force directions, and enables small, high capacity cells to be made. It is commonly used for loads above 200 kg.

FIG. 1D is a diagonally loaded ring load support member. This is not a common arrangement, possibly due to its height.

FIG. 1E is a diaphragm load cell support member although traditionally used for pressure transducers, a diaphragm with a central load receiving button can be used as a force transducer. The button diaphragm is the preferred option for load cells with more than 50 kg ratings. It is this type of load support member that is used in the embodiment given hereunder. All of the above configurations are options for load cells according to this invention.

The preferred embodiment of this invention allows for a robust, compact and fully sealed device and a range of rated loads can be accommodated by varying the diaphragm thickness in button diaphragm load support members.

When the load support member is machined, there is a requirement to achieve a particular standard of surface finish on the inside of the diaphragm The ability to finish machine the outside diaphragm surface and the button is limited by the support afforded by the diaphragm, which clearly relates to the eventual load rating of the cell. This standard of finish is preferably the same as prior art but it is not critical if is not to that standard.

Force measurement elements such as resistance strain gauges are the preferred force measurement element in this embodiment however there are Piezoelectric devices, and like devices which can within limitations directly provide a signal which varies in proportion to the applied force.

Figure 2:
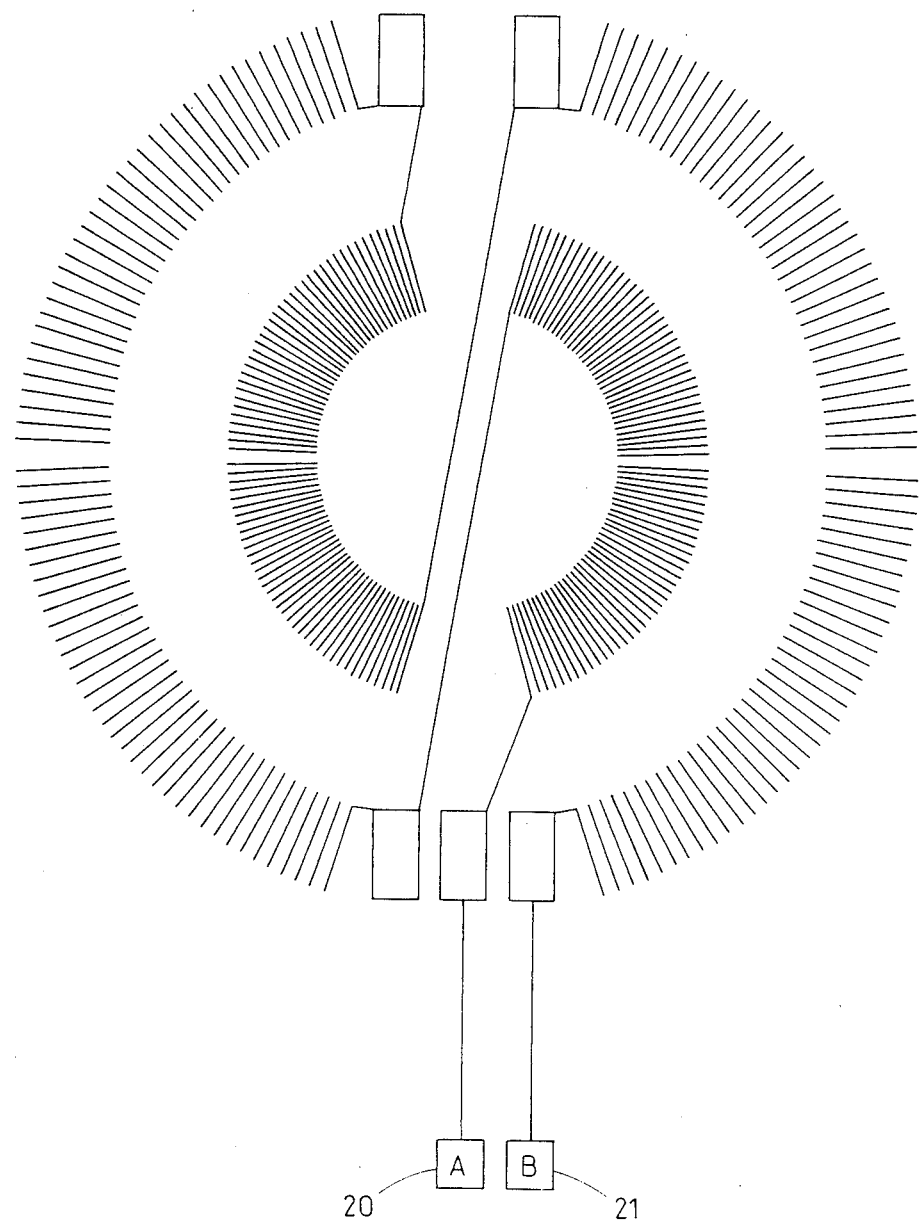
FIG. 2 shows a representation of a strain gauge suitable for application to a button diaphragm type of load cell.

Application of the strain detection element or strain gauge as they are commonly referred, preferably requires controlled surface preparation procedures however the prior stringency is somewhat relaxed or less critical and the cost of assembly is substantially reduced as a result. An example of a suitable strain gauge element is shown in FIG. 2 with input/output provided at 20 and 21 and denoted A and B in FIGS. 2 and 7. The reason for its shape will be apparent from an analysis of the stress distribution given at a later part of the specification.

Stainless steel Type 304 is used for machinability, but may not be available in the bar size required The alternative is 316, which is more readily available, has a slightly better fatigue strength, but is not as machinable. Both are weldable, in the event of a welded cable entry boss being required. Both can be stress relieved by heat treatment (250 to 300 degrees. C.) and have excellent stability.

Figure 3:
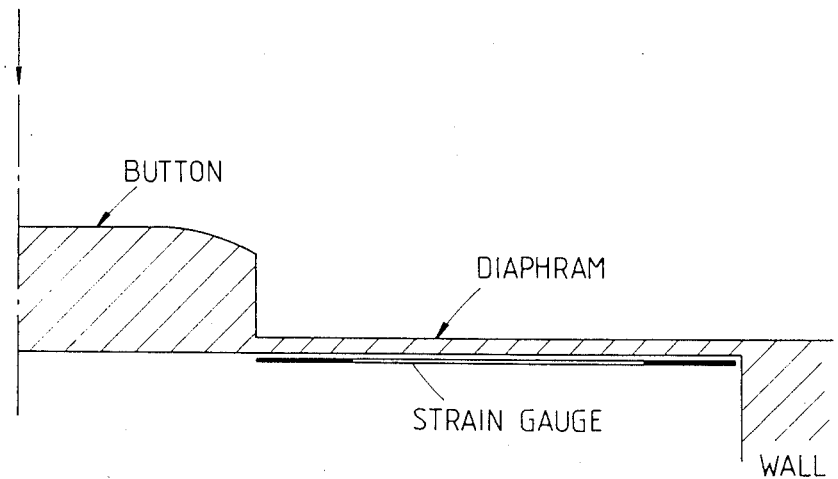
FIG. 3 shows a button diaphragm type load cell in partial cross section.
Figure 4:
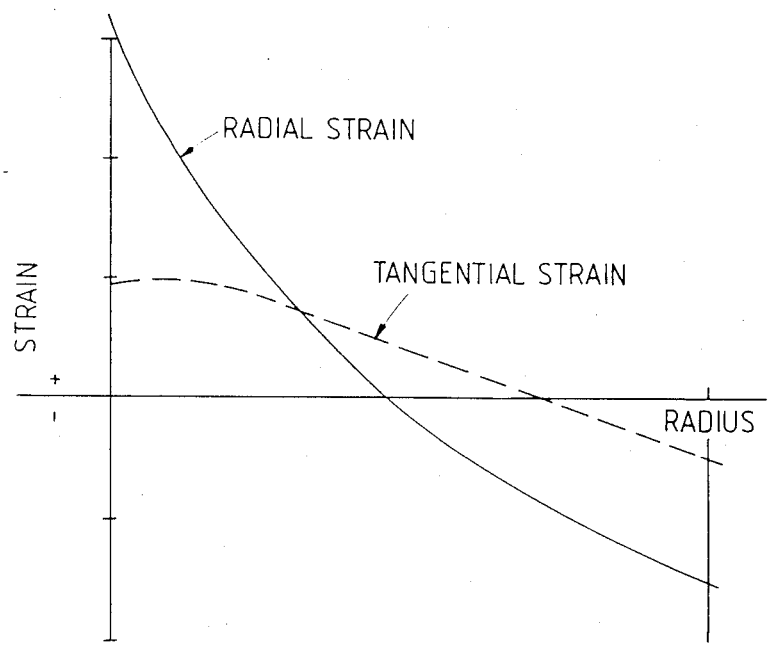
FIG. 4 shows a graph depicting stress distribution.

The stress distribution in a button diaphragm is subjected to an axial vertical button load is as shown in FIGS. 3 and 4. Clearly the optimum strain gauge would measure radial strain adjacent to the two circular edges of the diaphragm, and for elimination of secondary loads should be symmetrical about any diagonal. To maximise resistance and signal, an ideal strain gauge should be distributed fully around the circumference of the diaphragm as in FIGS. 2 and 3. The surface area being strained is thus highly utilised by the strain sensor and a large amount of resistance can be laid down in that area without having extremely fine conductors. Fine conductors tend to increase the strain gauge manufacturing costs.

If a single gauge is unavailable, a bridge of four separate conventional gauges laid along a diagonal can be used, but the penalty will be the cost of the gauges and extra assembly expense as well as reduced "conversion efficiency". Extra effort is required to place four gauges accurately and to achieve the extra interconnections. It should be noted that the sensitivity to off-axis forces will depend upon the accuracy of gauge placement. However, the use of individual gauges frees the designer to choose different diaphragm diameters.

Figure 5:
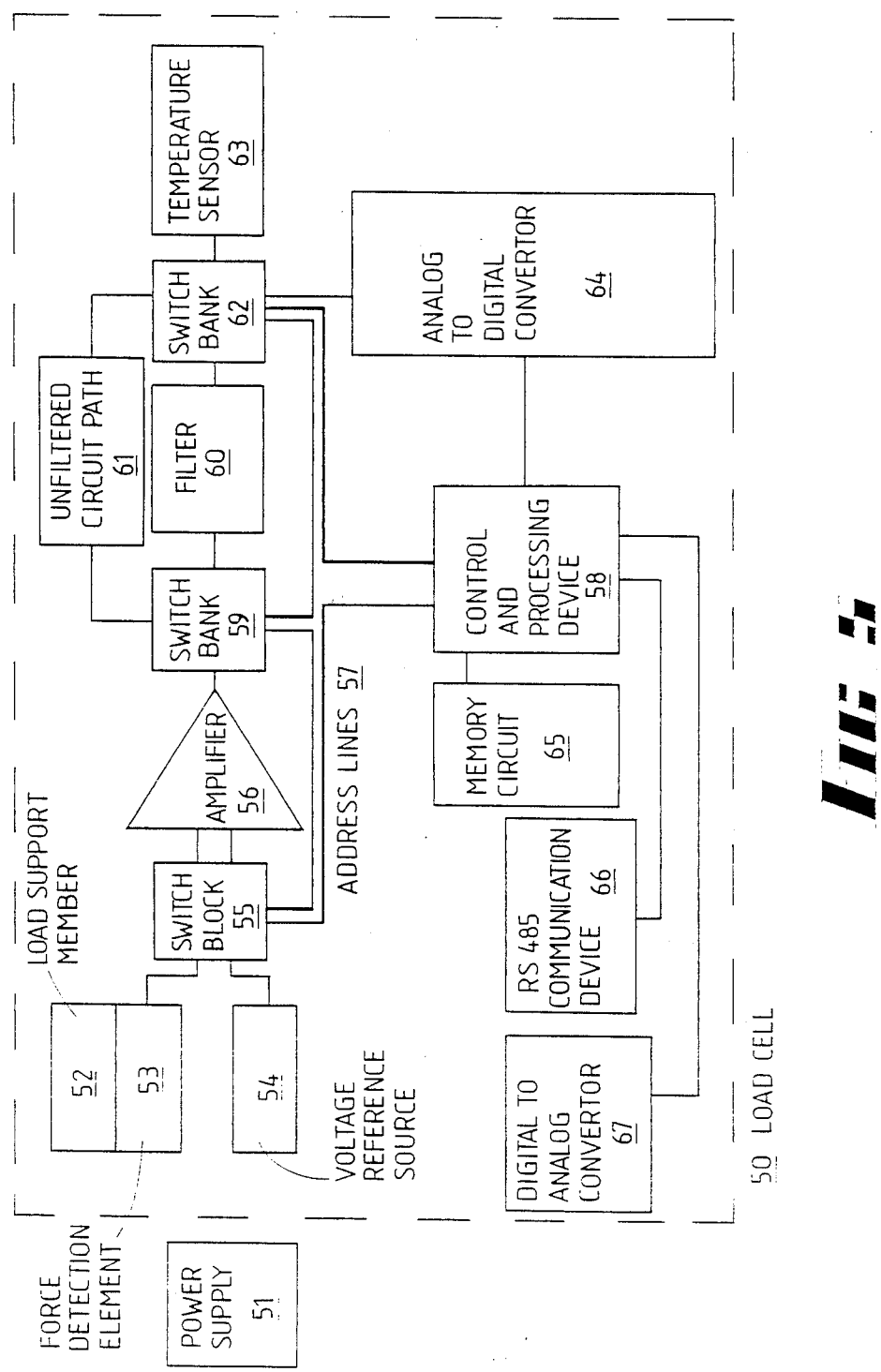
FIG. 5 shows a block diagram of the load cell electronics.
Figure 7:
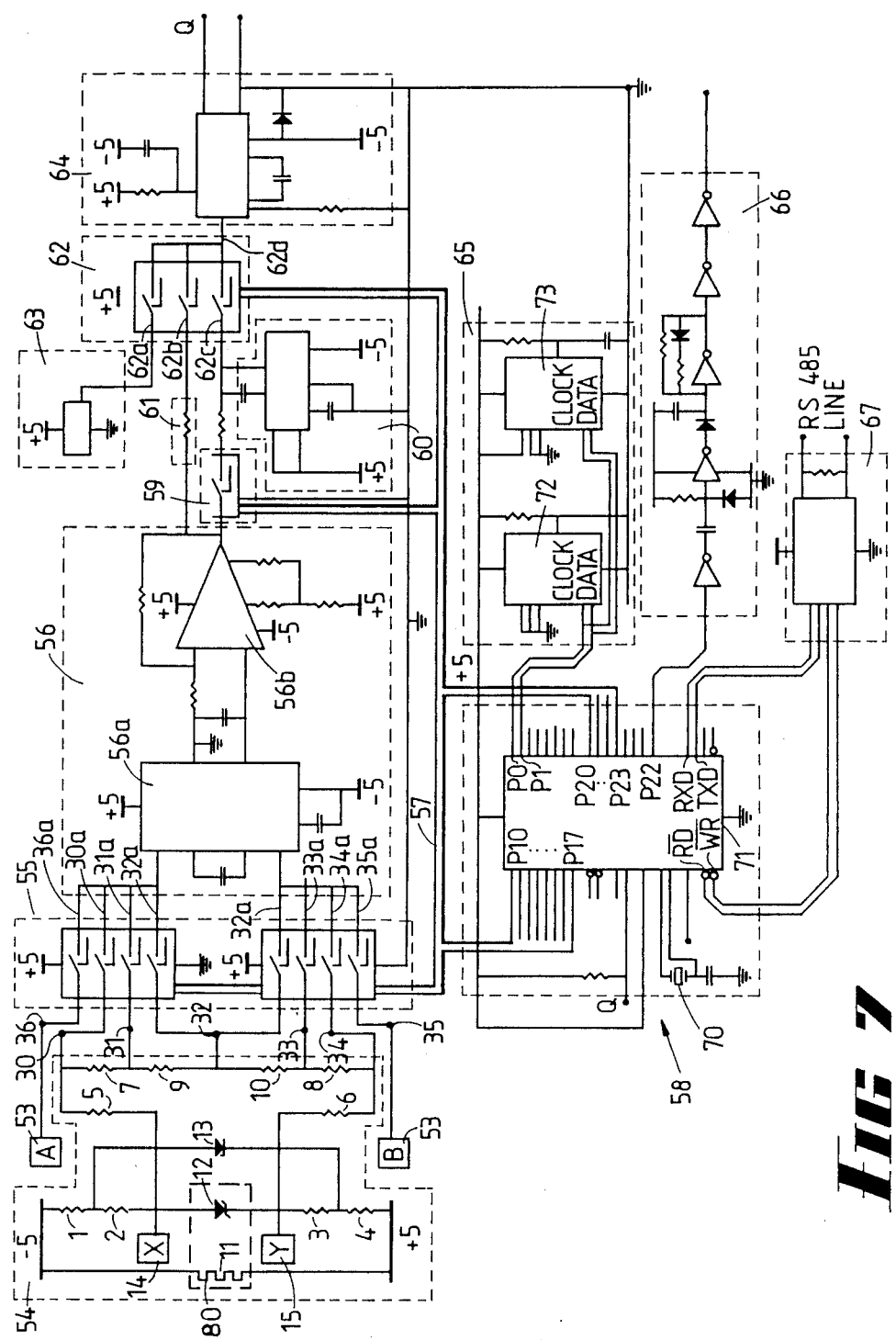
FIG. 7 shows a circuit diagram of the load cell electronics.

FIG. 5 shows a block diagram of a preferred embodiment of the invention. FIG. 7 shows an electronic circuit of the same embodiment of FIG. 5 and like numerals are used therein to indicate circuits which perform the functions described below. The block diagram substantially simplifies the description of the invention. The load cell embodiment is encompassed within the area designated 50. A power supply 51 is shown external although this may be incorporated into the embodiment of the invention without affecting the scope of the invention and certainly does not introduce any cause for corrections or other calibration technique.

Referring to FIG. 5 load support member 52 as described and shown previously in FIGS. 1, 3 and 4 and co-operates with a force detection element 53 which in this embodiment is shown as being of the type depicted in FIG. 2 A plurality of voltage references are provided by voltage reference source 54 and as will be seen a balanced output and input to the amplifier/integrator 56 is provided via a switch block 55. A number of voltage references are provided to enable a close match of the variable magnitude of the strain gauge output. Since the following amplifier operates in a differential mode this approach linearises the amplifier requirements and by appropriate design this characteristic can be met while not compromising gain and reduces offset and drift. The switch block is controlled via address lines 57 from the control and processing circuit 58, and allows the passage of selected combinations of reference voltages and or the strain gauge output to the next stage of the device The amplifier 56 adds minimal voltage offsets and drifts and since it is located almost immediately adjacent to the detection circuitry the effects of external environmental disturbance are substantially minimized and do not require offsets. Even internally generated effects such as solder joint resistance can be critical when current values in the micro ampere vicinity are being generated at the output of the gauge 53 and being matched by reference currents through precision resistors (50 ppm) in the reference circuit 54. A differential mode cancellation technique is used to minimize drifts and offsets. Further the use of a combination of switch settings to provide near zero voltage input to the amplifier aids the measurement technique and ensures as near absolute results as possible.

The control and processing circuits will measure the value of the reference outputs at periodic intervals and store them away for use at the next processing prompt for measurement of the applied force.

When the reference voltages are measured for a particular temperature their values are stored as a subset of the force verses strain element gauge output curves for each temperature. The reference values measured during the calibration mode are compared with the latest reference values and their difference is used to correct the drift of the amplifier gain which may have changed from the time the calibration was performed. Thus the force output value of the load cell is always corrected for long term environmental effects as well as for short term environment effects since it is apparent that amplifier and detection sensors have variability over time and temperature. Amplification is a continuous process and at a latter stage of the process calculations are performed during designated integration periods to allow a real time output delayed only by the integration period to be used.

The output of 56 is fed via a switch bank 59 which directs the signal via a filter 60 or a filter bypass circuit path 61. The filter is optimized to impede the passage of signals containing frequencies above 5 Hz. This vibration/interference being a common occurrence in industrial environments because of the proliferation of synchronous electric motors and their associated vibration.

However, since the filter itself induces a voltage offset and delay to the signal, switch banks 59 and 62 control the passage of filtered and non-filtered signal to the subsequent stages. Switch banks 59 and 62 like 55 are controlled by address lines 57 emanating from the control and processing circuit 58.

A temperature sensor 63 is also switched into the signal path and its output is fed to subsequent stages. The proximity of the temperature sensor to the gauge, load support member, collection, control and processing circuits ensures that its signal is truly representative of the load cell temperature condition. It is this sensor that is used during the calibration process for the load cell and during all subsequent measurements during the use of the load cell. Since temperature is a long time constant characteristic and the time to take a measurement is very fast no offsets or corrections need to be applied.

The selected output of 62 is fed to an Analog to Digital Converter 64. The 16 bit resolution of this device contributes to the final accuracy of the device and enables detailed analysis of the dynamics of the force/temperature verses strain gauge output. The digital output of 64 is fed to the control and processing device 58. This comprises a microprocessor and memory circuit 65 operating a machine code program. A higher level language would have delayed the computation and switching processes to the detriment of the accuracy of the load cell.

The machine code program within the control and processing device 58 provides the following functions:

(a) switches the appropriate signals to the A to D converter for presentation to the control and processing device 58;
(b) controls the choice of reference level appropriate to the force gauge output level;
(c) refers to the stored data in memory circuit 65;
(d) calculates interpolated equivalent values of the force and corrects where required at the ambient temperature based on the force gauge output characteristics stored in the load cell memory circuits,
(e) provides outputs of the calculated force in digital and analog form,
(f) interacts with an external computer device to conduct a calibration process involving all the aforementioned functions and at its completion receives and stores in its associated memory circuit 65, a revised table of load cell characteristics.

As described above an output of the control and processing device 58 is a representative of the force detected and an analog 0–2.5 volt signal is produced from a digital bit stream to analog signal converter 66 or a series digital bit stream conforming to RS 485 protocol is provided at 67. The latter output from 67 is also used to communicate incoming data to the processor 58 during the calibration process or ideally and generally used for data logging of the force measurements being made. In particular these later output means are less susceptible to extraneous influences because of their digital format and the error detection and correction techniques that can be applied.

As is apparent from the figures and foregoing description, all of the aforementioned circuitry is within a load cell and all environmental conditions are equally impressed upon each portion of the load support member, force detection element and the electronic circuitry as herein described. However it is also clear that with suitable adaption, the principles and devices disclosed could be used in different configurations to meet some or all of the needs of a load cell.

Figure 6:
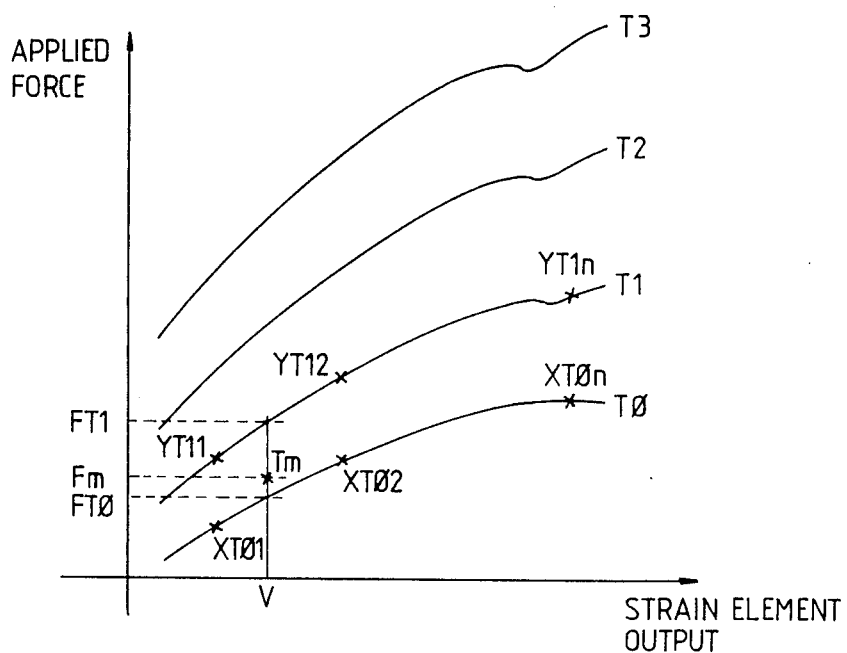
FIG. 6 shows a representation of the strain element output versus force at a variety of temperatures.

FIG. 6 depicts a graph of the applied force verses strain element output for a variety of temperatures of the load cell. This graph is complied during a calibration process by taking a number of values of each variable for each temperature and a program within the controlling computer calculates a line of best fit. When the characteristics of the load cell under test have been so determined an algorithm is applied to choose the minimum of representative values of the line of best fit and these are down loaded into the load cell memory circuit of the load cell for storage Additional to the compilation process for each temperature range and strain element output, a set of reference values and offsets applicable to the amplifier stages used is also generated and stored in the load cell memory circuit. This data is then used in the appropriate conditions to increase the overall accuracy of the load cell force measurement means of the invention.

Additional to the functions of the external computer mentioned previously (which may in another embodiment be internally located to the load cell), it may also provide graphical and tabular hard copy records of the load cell characteristics and assist in the manufacturing process by collating and analysing data pertaining to these manufacturing aspects.

The external (or internal) computer can also be used to rerun the calibration mode of the load cell to ensure the load cell accounts for any drastic environment or physical abuse it may have experienced since its last calibration.

FIG. 7 depicts a circuit configuration of the embodiment described in FIG. 5. It will be apparent to the skilled addressee that a variety of specific and different circuits could be employed to effect the invention, however, this embodiment serves to illustrate at least one successful implementation of its principles.

Circuit block 53 in FIG. 5 represents the strain gauge type shown in FIG. 2 which has output terminals A and B which are similarly marked on FIG. 7. As shown in FIG. 5 these two terminals are connected to nodes 36 and 35 which are connected to individual inputs of switch block 55. Extremely small (microvolt) analog signal values are detected on these two inputs and represent the variations of resistance available from the strain gauge placed across terminals A and B. Circuit block 54 represents a ratio metric configuration of resistors and its associated voltage reference circuit. Resistor 1 has a first node which couples to the −5 volt supply and a second node which couples a first node of resistor 2 and a first node of zener diode 13 and resistor 5. Resistor 5 has a second node which couples to a first node of resistor 7 and to node 30 which is an input to the switch block 55. Resistor 9 has a first node which is connected to the second node of resistor 7 and also to node 31 which is an input to the switch block 55. The other node of resistor 9 couples to node 32 which is an input to the switch block 55. The other node of resistor 2 is coupled to a first node of zener diode 12 which forms part of voltage regulator 80.

Resistor 4 has a first node which couples to the +5 volt supply and a second node which couples to a first node of resistor 3 and a second node of zener diode 13 and resistor 6. Resistor 6 has a second node which couples to a first node of resistor 8 and node 34 on input to the switch block 55. Resistor 10 has a first node which is connected to the second node of resistor 8 and also to node 33 which is an input to the switch block 55. The other node of resistor 3 is coupled to a second node of a zener diode 12 which forms part of voltage regulator 80.

It is preferable that each resistor pair (1,4) (3,2) (5,6) (7,8) (9,10) have identical properties. It has been found that this can be achieved by constructing this configuration of resistors from a monolithic resistance and conductance material in the form of a hybrid chip. Therefore the characteristics of the resistors may not be highly precise (50 ppm) as is the case in prior art voltage divider networks, however, the reciprocity of the resistors in the pairs ensures that even though there may be a drift in the voltage reference there will be exhibited at the differential inputs of the amplifier block 56 no discernable change in relative reference voltages for no load calibration purposes.

This configuration of resistors provides at least 8 even percentages of coverage of the no load to full load characteristic curve FIG. 6 of the sensor against which the calibration voltages may be checked. The most appropriate coverage is selected by the control and processing circuit 58 and physically switched through to the amplifier block 56 by controlling the switch block switches via control bus 57.

The location of this configuration of resistors is such that it is acted upon by all other subsequent measurement and conversion blocks of the invention and is also subject to the same interference as the remainder of the circuit.

Switch block 55 may be any of a number of conventional analog switch circuit chips having more or less switches appropriate to the resistor configuration.

Amplifier block 56 incorporates substantially conventional circuits for the purpose of the present invention wherein 56a is a LTC1043 and 56b is an OP-27 operational amplifier both being well known instrumentation amplifier chips. It has been found that due to the ratio metric configuration of the reference resistor network the quality of this amplification stage can in fact be lower than that represented by the above-described embodiment. The amplifier block provides a single preset voltage gain and does not require any adjustment during the lifetime of the load cell. Prior art weighing systems are well known for the need to have variable gain requirements for this first stage amplification to account for the dynamic range of the voltages presented by strain gauges in those systems, however for each gain level chosen new offsets and noise figures are experienced. Also it has been found that each additional circuit element added becomes just one more component capable of drifting in value during measurement and necessitates primary calibration ideally before each measurement.

Amplifier block 56 has a first output which couples to a first node of resistor 61 which conducts the varying voltage signal output from the amplifier block 56 to a node 62b of analog switch bank 62. This path of voltage signal is used for measuring the calibration values of the strain gauge and the various reference resistor voltages unimpeded and without delay by filter or other networks. This ensures that calibrations and voltage reference measurements taken to provide adjustments for temperature and other external effects can be achieved without undue delay (e.g. milliseconds) or the need for any d.c. offset allowance.

Prior art weighing systems commonly incorporate passive and active filter networks or additional amplifier stages at this point which are permanently in circuit thereby adding delays to signal integration times and additional offsets and noise to the signal which require additional correction and inscribe inaccuracies into the measurement.

The first output of amplifier block 56 is also coupled to an input of analog switch block 59. This block comprises only one switch and when closed for conduction it connects the output of the amplifier to a first node of filter 60. Filter 60 comprises a well known chip configured to provide a zero d.c. error 5th order Butterworth low pass filter with an extremely sharp cutoff characteristic at 5 Hz. The particular choice of a 5th order filter is in marked contrast to prior art filters used in conventional weighing systems which are first order capacitive element low pass filters instead of active filters. The aim of these prior art passive element filters is to eliminate signals which are generated by industrial interference typically 50 Hz, 60 Hz and 400 Hz electromagnetic noise signals. It is also well known that these simple filters increase the integration period of any measurement cycle of the process and in some instances the period required is seconds. This long time period is required so that the accuracy of the measurement can be improved. This approach is not suited to the present invention since the accuracy of the circuit is such that an integration period of minutes would be required to match the rest of the circuit. It is also well known that the capacitive element of these prior art filters do not always maintain their stability characteristics over time which thereby adds unknown inaccuracies to the measurements taken through the filter and in fact the practice of integrating measurements over multiples of periods of the likely industrial noise frequency still does not account for the inaccuracies of the capacitor value.

The sharp cutoff of the active filter of the present invention and the provision of a separate path for filtered and unfiltered signals requires maximum integration periods of 166.666 m seconds to achieve 16 bit accuracy and 41.66 m seconds to achieve 14 bit accuracy which also counts for the 24 Hz base period of common 1440 r.m.p. vibrations of industrial equipment. The separate unfiltered calibration path has no d.c. error component so that no offset is required and the speed of measurement during calibration extremely fast.

Temperature sensor 63 comprises a suitable temperature sensor chip which is coupled to input 62a of the analog switch 62. It has been found that the temperature of the load cell and in particular the junction area of the load support member 52 and the strain gauge 53 is the critical area for temperature measurement. It is not adequate to measure the temperature on the outside of the cell nor is it adequate to measure the temperature on any part of the platform or of the load being weighed. Differentials of 10° C. have been detected between a position on the junction area and the outside of the cell and the differential itself does not vary consistently with time and temperature. Therefore it is important in any load weighing system that temperature characteristics upon which all other characteristics are corrected against are taken from a location which provides repeatable and consistent results over time and the full dynamic range of the temperature environment. In this embodiment which differs from all known prior art, the temperature sensor is located on the beam of the actual load cell itself.

The output node 62d of the analog switch 62 is coupled to a conventional analog voltage to digital value convertor 64. In this embodiment the analog voltage to digital bit value is achieved in two steps whereby the converter 64 comprises a voltage to frequency converter, which provides a frequency output which is counted by the microprocessor device 71 to provide a digital value. The configuration and operation of such analog to digital operation is well known suffice to indicate that 16 bit and 14 bit accuracy of voltage measurement achievable when used in the embodiment shown.

Output node Q is coupled to the microprocessor device 58 at a node Q. Those skilled in the art will recognize that the microprocessor device 71 includes substantially conventional circuits and that other types of computing devices may be adapted to the requirements of the invention. It will be apparent to those skilled in the art, that the form of steps to provide the invention as described can be very different, however, it will be apparent it can be developed from the description herein without further inventive skill.

The clock reference of the microprocessor 57 is a crystal oscillator 70. Drift in this and the frequency reference of the voltage to frequency convertor 64 will be affected by temperature and since these devices are contained within exactly the same environment its influence will be simultaneous and become part of the recalibration loop and are therefore of no measurable consequence.

Parallel input/output ports P10-P17 and P20-P23 of microprocessor 71 couple to the bus 57, to provide programmable control bits for controlling the functioning of analog switches contained in 57, 59 and 62.

Parallel input/output ports PO1 and PO2 are coupled to the clock (CLK) and data (DATA) ports of the memory circuit 65. This memory circuit comprises electrically erasable, programmable read only memory chips 72 and 73 which those skilled in the art will recognize may be of other memory chip types. These memory chips contain the programmed stored data and tables of load cell characteristics which are written to and read from by the microprocessor 57, via the DATA lines.

The tables of load cell data contained within memory circuit 65 are used to update each auto-calibration process which can be initiated and completed within a very short period of time as a result of the measurement paths available. Read operations from this circuit are conducted during measurement processes particularly during interpolation procedures.

An example of a table stored in the memory circuit 65 comprises a minimum number of points along the temperature curve of the force v strain element output characteristic of the load cell which can reproduce the curve for its best fit when the curve comprises an infinite number of points. There exists a table for one each of a range of temperatures. However, it will be appreciated that if the load cell is used in a constant temperature environment only one such table will be required. By way of example FIG. 6 depicts a variety of points $X_{T.1}$-$X_{T.N}$ along temperature curve T$\phi$ and corresponding points $Y_{T1.1}$-$Y_{T1.N}$ along curve T1. It is important to note that the temperature characteristic curve may be a great deal more complicated than shown in this example, for instance, there may be many more perturbations than shown in the vicinity of $Y_{T1.N}$.

The task of reducing the number of calibration measurement points into the minimum stored is a process well known in the relevant art, however, it is not known to use such a process in this field of application.

When a measurement of load cell strain element output is made along with the temperature at which the measurement was taken it is likely not to fall on any one of the curve representations stored in memory.

A process of interpolation is undertaken to provide a value of applied force representative of the measure of strain element voltage. This process in prior art approaches rounds off the temperature value to one of those stored in their tables and then calculates the slope of the curve at the vicinity of the measurement by choosing the calibrated strain element output above and below the measured value and calculating the predicted applied force.

In this embodiment the interpolation process involves a choice of the tables for temperatures above and below the measured temperature, in this example T1 above and T$\phi$ below. Then the nearest strain element values above and below the measured strain element voltage output are chosen for each of the temperatures T1 and T$\phi$, in this example $Y_{T1.1}$ and $Y_{T1.2}$ for temperature T1 and $X_{T.1}$ and $X_{T.2}$ for temperature T$\phi$. As per prior art the slopes of the temperature charts in this vicinity are calculated and the forces FT$\phi$ and FT1 are also calculated based on the measured strain element voltage output. The next phase of the interpolation assumes a linear variation of temperature between temperature curves and the force representative of the measured strain element output is calculated to be Fm.

When a measurement of the temperature and strain element output voltage is taken, the microprocessor 71, also takes a measurement of the most appropriate combination of reference resistors to indicate the difference between the measurement at this time with the measurement of that same resistor combination at calibration and use the calculated difference to offset the measured value.

Therefore it can be seen that tables of load cell data are kept not only on a temperature by temperature basis but also for each combination of resistors required to thereby provide a broad and accurate coverage of the output of the strain gauge output.

Parallel output port P27 provides a digital bit stream representative of the measured and interpolated applied force, to the circuit embodied in conversion block 66 which thereby provides by well known circuit techniques an analog 0–2.5 volt signal. This signal is commonly used for display and recording in instrumentation applications.

Microprocessor 71 has outputs RD and WR which control the functions of reading RD and writing WR of data from and to a communication bus which usages the well known RS485 communications format.

Input RXD receives such communication and output TXD transmits such data to and from the microprocessor 71. This feature allows direct digital output of the results of measurements as well as all the data collected during measurement and calibration of the load cell. This facility also allows a PC based device external to the load cell to control the initial calibration process and if necessary reduction of measured values into selected points for saving in tables contained in the load cell electronics.

All the devices described by way of examples in the above description of FIG. 7 are contained within the load cell itself and are subject to all the normal and abnormal effects of load and environment to ensure that the invention provides a fully self correcting load cell for use by untrained personnel.

I claim:

1. A load cell comprising a load support member within which is located, a force detection element having a first and second output wherein the force detection element cooperates with the load support member to change its electrical characteristics upon the application of force upon the load support member and output a voltage signal representative of the applied force on said first and second outputs, voltage signal amplifier means having first and second voltage input means, analog voltage signal to digital signal conversion means, memory circuit means, processing means, voltage reference signal means comprising, voltage source means, a voltage divider network coupled to said voltage source means comprising a plurality of resistors in ratiometric configuration wherein said resistors are coupled to each other at nodes at which selected voltage reference signals exist, a switch means comprising a plurality of inputs, a plurality of switches and first and second outputs, a first one of said plurality of inputs for receiving signals from the first output of the force detection element, a second of said inputs for receiving signals from the second output of the force detection element, connection means between first and second outputs of said force detection element and said first and second switch means inputs, a plurality of connection means each being between a node of the voltage divider network and one of said plurality of switch means inputs, wherein pairs of inputs receive signals from pairs of selected voltage reference signals, said plurality of switches being controlled by the processing means to connect pairs of said inputs to the first and second output of the switch means, connection means between first and second outputs of the switch means and first and second inputs of the voltage signal amplifier means, said analog voltage signal to digital signal conversion means coupled to said voltage signal amplifier means for converting in turn an analog voltage signal into a digital signal having value responsive to said applied force and said voltage reference signal, said processing means coupled to said analog voltage signal to digital signal conversion means for receiving said values, and coupled to said memory storage means to store a predetermined number of values representative of said applied force and said voltage reference signal in said memory circuit means, said processing means further comprising means for comparing received values with values stored in the said memory circuit means and means for interpolating between stored values greater than and less than a received value for determining the applied force.

2. A load cell according to claim 1 wherein said switch means comprises integrated circuit switches controlled by the said processing means.

3. A load cell according to claim 2 wherein said first and second outputs of the switch means are differential voltage signals.

4. A load cell according to claim 1 wherein the processing means comprises selection means for selecting pairs of reference voltage signals similar in value to the voltage signal output of the force detection element.

5. A load cell according to claim 4 wherein there exists a configuration of the switch means which shorts the inputs of a pair of switch means inputs which is thereby used as a zero voltage reference for the voltage signal amplifier means.

6. A load cell according to claim 1 wherein the voltage source means comprises a pair of differential voltage sources.

7. A load cell comprising a load support member within which is located, a force detection element having a first and second output wherein the force detection element cooperates with the load support member to change its electrical characteristics upon the application of force upon the load support member and output a voltage signal representative of the applied force on said first and second outputs, voltage signal amplifier means having first and second voltage input means, analog voltage signal to digital signal conversion means, memory circuit means, processing means, voltage reference signal means comprising, voltage source means, a voltage divider network coupled to said voltage source means comprising a plurality of resistors in ratiometric configuration wherein said resistors are coupled to each other at nodes at which selected voltage reference signals exist, a switch means comprising a plurality of inputs, a plurality of switches and first and second outputs, a first one of said plurality of inputs for receiving signals from the first output of the force detection element, a second of said inputs for receiving signals from the second output of the force detection element, connection means between first and second outputs of said force detection element of said first and second switch means inputs, a plurality of connection means each being between a node of the voltage divider network and one of said plurality of switch means inputs wherein pairs of inputs receive signals from pairs of selected voltage reference signals, said plurality of switches being controlled by the processing means to connect pairs of said inputs to the first and second output of the switch means, connection means between first and second outputs of the switch means and first and second inputs of the voltage signal amplifier means, said amplifier means further comprising a first output and a second output carrying identical signals, signal filter means having an input and an output, second switch means having an input and an output, connection means between the first output of the amplifier means and the input of the second switch means, connection means between the output of the switch means and the input of the signal filter means, said second switch means being controlled by the processing means to connect and disconnect the input to the output of the second switch means and thereby control the application of the signal from th e first output of the amplifier to the signal filter means, a third switch means having first and second inputs and first and second outputs, connection means between the second output of the amplifier means and a first input of the third switch means, connection means from the first output of the third switch means and the said analog voltage signal to digital signal conversion means, said third switch means being controlled by the processing means to connect and disconnect the first input to the first output of the third switch means and thereby control the applications of the signal from the second output of the amplifier to the analog voltage signal to digital signal conversion means which thereby provides a path past the filter for the voltage signal from the amplifier means, connection means between the output of the filter means and the second input of the third switch means, connection means between the second output of the third switch means and the analog voltage signal to digital signal conversion means, said third switch means being controlled by the processing means to connect and disconnect the second input to the second output of the third switch means and thereby control the application of the signal from the output of the filter means to the analog voltage signal to digital signal conversion means, said analog voltage signal to digital signal conversion means coupled to said first and second outputs of said third switch means for converting in turn an analog voltage signal into a digital signal having values responsive to said applied force and said voltage reference signal, said processing means coupled to said analog voltage signal to digital signal conversion means for receiving said values, and storing a predetermined number of values representative of said applied force and said voltage reference signal in said memory circuit means, said processing means further comprising means to store in the memory circuit means a plurality of values representative of the applied force whereby said plurality of values are produced by the said analog voltage signal to digital signal conversion means when the second and third switch means are controlled to provide a path past the filter for the voltage signal from the amplifier means.

8. A load cell comprising a load support member within which is located; a force detection element having a first and second output wherein the force detection element cooperates with the load support member to change its electrical characteristics upon the application of force upon the load support member and output a voltage signal representative of the applied force on said first and second outputs; voltage signal amplifier means having first and second voltage input means; analog voltage signal to digital signal conversion means; memory circuit means; processing means; voltage reference signal means comprising, voltage source means, a voltage divider network coupled to said voltage source means comprising a plurality of resistors in ratiometric configuration wherein said resistors are coupled to each other at nodes at which selected voltage reference signals exist; a switch means comprising a plurality of inputs, a plurality of switches and first and second outputs; a first one of said plurality of inputs for receiving signals from the first output of the force detection element; a second of said inputs for receiving signals from the second output of the force detection element, connection means between first and second outputs of said force detection element and said first and second switch means inputs; a plurality of connection means each being between a node of the voltage divider network and one of said plurality of switch means inputs wherein pairs of inputs receive signals from pairs of selected voltage reference signals; said plurality of switches being controlled by the processing means to connect pairs of said inputs t the first and second output of the switch means; connection means between first and second outputs of the switch means and first and second inputs of the voltage signal amplifier means; said amplifier means further comprising a first output and a second output carrying identical signals; signal filter means having an input and an output; second switch means having an input and an output; connection means between the first output of the amplifier means and the input of the second switch means; connection means between the output of the switch means and the input of the signal filter means; said second switch means being controlled by the processing means to connect and disconnect the input to the output of the second switch means and thereby control the application of the signal from the first output of the amplifier to the signal filter means; a third switch means having first, second and third inputs an d first, second and third outputs; connection means between the second output of the amplifier means and a first input of the third switch means; connection means from the first output of the third switch means and the said analog voltage signal to digital signal conversion means; said third switch means being controlled by the processing means to connect and disconnect the first input to the first output of the third switch means and thereby control the application of the signal from the second output of the amplifier to the analog voltage signal to digital signal conversion means which thereby provides a path past the filter for the voltage signal from the amplifier means; connection means between the output of the filter means and the second input of the third switch means; connection means between the second output of the third switch means and the analog voltage signal to digital signal conversion means; said third switch means being controlled by the processing means to connect and disconnect the second input to the second output of the third switch means and thereby control the application of the signal from the output of the filter means to the analog voltage signal to digital signal conversion means; said analog voltage signal to digital signal conversion means coupled to said first and second outputs of said third switch means for conversion in turn an analog voltage signal into a digital signal having a values responsive to said applied force and said voltage reference signal; said processing means coupled to said analog voltage signal to digital signal conversion means for receiving said values; and storing a predetermined number of values representative of said applied force and said voltage reference signal in said memory circuit means; temperature sensing means having an output carrying a voltage temperature signal representative of the temperature; connection means between the temperature sensing means output and the third input of the third switch means; connection means between the third output of the third switch means and the analog voltage signal to digital signal conversion means; said third switch means being controlled by the processing means to connect and disconnect the third input to the third output of the third switch means and thereby control the application of the voltage temperature signal from the output of the temperature sensing means to the analog voltage signal to digital signal conversion means; said processing means further comprising means to store in the memory circuit means a plurality of temperature values representative of the voltage temperature signal whereby said plurality of temperature values are produced by the said temperature sensing means; said processing means further comprising means to control said second and third switches such that values responsive to said applied force and said voltage reference signal are received in turn by the processing means via the first and second outputs of the third switch means and related in the memory means to the temperature value received via the third output of the third switch means; said processing means further comprising means for comparing received values with values stored in the said memory circuit means and means for interpolating between stored values greater than and less than a received value for determining the applied force.

* * * * *